United States Patent [19]
Ehrlich

[11] Patent Number: 5,549,828
[45] Date of Patent: Aug. 27, 1996

[54] METHOD AND APPARATUS FOR IN SITU WATER PURIFICATION INCLUDING SLUDGE REDUCTION WITHIN WATER BODIES BY BIOFILTRATION AND FOR HYPOLIMNETIC AERATION OF LAKES

[76] Inventor: Karl F. Ehrlich, P.O. Box 208, North Hatley, Québec, Canada, J0B 2C0

[21] Appl. No.: 216,273

[22] Filed: Mar. 23, 1994

[51] Int. Cl.⁶ .................................. C02F 3/06; C02F 1/74
[52] U.S. Cl. ...................... 210/602; 210/606; 210/610; 210/617; 210/620; 210/747; 210/758; 210/150; 210/170; 210/199; 210/221.2; 210/238; 210/242.2
[58] Field of Search .............................. 210/242.2, 602, 210/606, 610, 616, 617, 620, 626, 747, 758, 150, 151, 199, 221.1, 221.2, 237, 238, 170

[56] References Cited

U.S. PATENT DOCUMENTS

| | | | |
|---|---|---|---|
| 3,218,042 | 11/1965 | Ciabattari et al. | 210/620 |
| 4,008,155 | 2/1977 | Castell | 210/242.1 |
| 4,030,859 | 6/1977 | Henegar | 210/242.2 |
| 4,169,050 | 9/1979 | Serfling et al. | 210/615 |
| 4,229,302 | 10/1980 | Molvar | 210/237 |
| 4,690,756 | 9/1987 | Van Ry | 210/221.2 |
| 4,724,086 | 2/1988 | Kortmann | 210/242.2 |
| 4,780,217 | 10/1988 | Petersen | 210/758 |
| 4,883,588 | 11/1989 | Primavera et al. | 210/238 |
| 5,316,671 | 5/1994 | Murphy | 210/242.2 |
| 5,326,475 | 7/1994 | Kent | 210/747 |

FOREIGN PATENT DOCUMENTS

| | | | |
|---|---|---|---|
| 1650613 | 5/1991 | U.S.S.R. | 210/242.2 |

*Primary Examiner*—Peter A. Hruskoci
*Assistant Examiner*—Theodore M. Green
*Attorney, Agent, or Firm*—ROBIC

[57] ABSTRACT

A method and an apparatus for in situ purification by aeration and biofiltration of water from a water body. According to this method, polluted and/or oxygen deficient water is drawn through a conduit into a submerged chamber held adjacent to the surface of the water body. Water is oxygenated from three sources: air injected into the conduit to draw the water into the submerged chamber, air diffusing from the surface of the water body; and air injected in a lower portion of the chamber. The oxygenated water flows downwardly from the chamber through a submerged biofilter having a filter bed made of filtering media which may be preinoculated with beneficial microorganisms and essential nutrients. Rafted or floating vascular plants can be inserted into the chamber to enhance purification by fixing metals. If desired, organic sludge can also be drawn into the chamber for biodigestion by continuous or intermittent supply of microbial cultures specifically grown to optimize production of enzymes which solubilize the organic sludge. The biochemical oxygen demand (BOD) for the sludge solubilization is satisfied by the aeration and biological filtration capacity of the apparatus. Such method and apparatus are designed to provide a stable working environment in open water bodies. They can also be used achieve hypolimnetic aeration within a lake.

25 Claims, 7 Drawing Sheets

METHOD AND APPARATUS FOR IN SITU WATER PURIFICATION INCLUDING SLUDGE REDUCTION WITHIN WATER BODIES BY BIOFILTRATION AND FOR HYPOLIMNETIC AERATION OF LAKES

BACKGROUND OF THE INVENTION

1. Field of the Invention

The present invention relates to a method and an apparatus for the in situ purification by biofiltration and aeration, of water within water bodies such as waste water treatment plants, lakes, bays, ponds or lagoons.

The invention also relates to a method and apparatus of the reduction of sludge within such waterbodies.

2. Brief Description of the Prior Art

Major goals of waste water treatment are to remove organic or nitrogenous pollutants as well as excessive concentrations of metals from the water, and to assure adequate levels of oxygen. Associated with the improvement is the goal to reduce sludge accumulation equally as part of the waste water treatment process or within water bodies.

Hitherto, the biological purification of water by aerobic processes, has been accomplished by providing aeration either within the water column or by passing water through a physical substrate. In the first case, water purifying micro-organisms are supposed to appear spontaneously within the aerated water, to biodegrade the pollution. In the second case, the micro-organisms are supposed to also appear spontaneously and develop on the physical substrate as aerated water flows through the physical substat. In both situations the micro-organisms are not only supposed to appear but they are also supposed to be in the optimal physiological condition. Biological filters provide physical surfaces on which the micro-organisms can develop and in this manner biological filters increase the numbers of micro-organisms available for the treatment, in comparison with those in the water alone.

The efficiency of the biological purification is known to be function of various key factors including:

- the availability of a balanced community of micro-organisms and other organisms capable of biodegrading or, at least, bioaccumulating the target pollution,
- the quantity of micro- and other organisms in the above community,
- the physiological condition of the micro-organisms in the above community,
- the surface area of the physical substrate available for the growth of the micro-organisms,
- the nature of the substrate to allow colonization by the micro-organisms,
- the flow rate through the biological filter to assure the adequate supply of food to the micro-organisms, to assure that the pollution is removed by the biological filter faster than it enters the water body,
- the open area within the biological filter to minimize clogging and frequency of cleaning.

A useful biofilter should also be simple to use and cost-effective.

Hitherto, biological water waste water purification has been accomplished by the use of water based systems such as activated sludge or oxidation or facultative lagoons. Alternatively, fixed film systems such as trickling or rotating biological filters have been used. Expansion of water based systems to meet increasing pollutional loads usually results in the costly expansion of the waste water treatment plant rather than increasing the treatment capacity of the existing structures. Decreasing budgets often associated with limited space have created a demand for ways to increase treatment efficiency cost-effectively.

Hitherto, the combination of aeration and biological filtration has been applied to lakes and other water bodies, although of use of aeration alone is more common in lakes. In temperate climates, lakes and other water bodies generally stratify in summer, resulting in the formation of three distinct layers: the epilimnion—that part of the water column in contact with the surface, the metalimnion—a transition zone, and the hypolimnion—that part of the water column in contact with the bottom of the water body. The epilimnion generally remains oxygenated due to contact with the atmosphere at the surface and is the warmest part of the water body. The hypolimnion, by contrast in eutrophic water bodies, usually becomes anoxic resulting in the loss of higher life forms (fishes and benthic organisms), the liberation of pollutants from the sediments and the rapid accumulation of organic sediments and thus the filling in of the lake. The hypolimnion contains the coldest water in the lake, during summer. The liberated pollutants are subsequently distributed throughout the lake when the layers in the lake are mixed during the spring and fall turnover periods; this then results in increases in algal growth within the epilimnion. Lake aeration which assures the presence of oxygen at the soil/water interface will minimize the release of nutrients from the sediments, allow the development of populations of higher life forms (fishes and benthic organisms) and accelerate the decomposition of organic sediments.

There are three basic approaches to lake or water body aeration:

- Epilimnetic aeration—this method does nothing to improve conditions in the hypolimnion or at the soil/water interface, which is often a or the major source of pollutants entering the water column.
- Bottom mounted aeration—this method destratifies the water column making oxygen levels and temperature uniform. The temperature of the destratified lake usually is closer to that of the epilimnion than to that of the hypolimnion. Thus the lake tends to be warmed.
- Hypolimnetic aeration—this method brings oxygen to the hypolimnion without destratifying the water column. A major advantage of this method is that different temperature layers are maintained allowing the development of species preferring cold water in the hypolimnion (e.g. trout) and species preferring warmer conditions in the epilimnion (e.g. bass).

Bottom mounted aeration entrains water from the bottom to the surface. This technique, when applied to a lake or water body and designed to achieve destratification, is very efficient, because the bulk of the aeration is accomplished by diffusion from the atmosphere. The actual oxygen transfer from the injection of the air into the water is of limited value for several reasons including declining hydrostatic pressure, decreasing oxygen content of the bubbles and increasing oxygen content of the water, which is moving in parallel with the rising bubbles. These problems are particularly problematic in hypolimnetic aeration systems where water from the bottom is moved to the surface by aeration and then returned to depth to avoid destratification of the water column. The inefficiencies, mentioned above, often result in excessive energy being required to achieve the desired effect of increasing oxygen concentration within the hypolimnion.

Aeration efficiency is a function, in part, of the bubble size, the contact time of the bubble with the water and the oxygen gradient between the bubble and the water. Counter current systems are particularly advantageous for increasing the efficiency of gas exchange. The principle of the counter current is that water and air or oxygen supplied travel in opposite directions so that as the water becomes oxygenated it contacts air with increasing oxygen concentration. An additional benefit can be achieved if water flows downward so as to slow the rise of the gas bubbles, thus increasing the retention time of the bubbles within the water column.

In Canadian patent No. 747,976, there is disclosed an aeration device which combines aeration with biological filtration. This device includes a porous mass of material having a large surface area on which biological material or slime is allowed to grow. The device is submerged, in a body of water, and water is caused to flow through the porous material by injection of air below the porous material. The air rises through the porous material entraining water with it bringing water and oxygen in contact with the slime of the biological filter. Even though this device offers the theoretical potential to combine aeration and biofiltration, within a lake, there are several serious conceptual limitations of Canadian patent No. 747,976.

Biological growth on the biofilter is an uncontrolled process. There is no mention in this patent of the need to inoculate, fix or immobilize desired communities of water purifying micro-organisms, and bacterial augmentation has been shown to be able to improve water purification.

There is no suggestion in this patent to use plants to enhance water purification, even though there is a growing wealth of information on the benefits and potential of including plants in the treatment process. Aeration efficiency is also very low with this patented device for many reasons:

- The air diffusers are placed directly below the biological filter. This method entrains anoxic or poorly oxygenated water, as is the goal of an aeration device. It is stated in the patent that the device is designed to be placed in areas with high oxygen demand. However, the placement of the diffusers directly below the porous material does not allow adequate contact time for oxygen transfer. Poorly oxygenated water entering a biological filter is undesirable as it can limit biological activity.
- Air bubbles entering the biological filter will coalesce, due to contact with the material, to form larger bubbles. The larger bubbles will have reduced surface to volume ratios and will decrease gas transfer.
- Even though the device is described as an aerator, very little actual oxygen addition can be anticipated, because the coalescence of the bubbles as they pass through the biofilter will result in very large bubbles leaving the biofilter and rising to the surface. Such bubbles have very little value in terms of oxygen addition.
- The aeration device is not designed to take advantage of the technique of bringing subsurface water, particularly that from the hypolimnion, which is poor in oxygen, in contact with the surface. It is at the surface that water can be inexpensively aerated by being placed in contact with the atmosphere, which contains 20% oxygen. The movement of air through the biofilter will cause the bubbles to coalesce resulting in fewer large bubbles rising to the surface from the biofilter. This random distribution of large bubbles is not efficient for water movement. The large bubbles will move through the water without entraining water to the surface.
- A relatively large amount of air must be used to move the water and oxygenate the biofilter because of the above design deficiencies.

With the device of this patent, it is further very difficult to maintain the biological floc on the porous material designed for this purpose, because of the scrubbing action of the air bubbles flowing through the filter media. Injection of air bubbles under submerged biofilters is a standard mechanism used to remove growth accumulations. The continual injection of air bubbles, particularly coalescing ones, will provide a continual scrubbing and removal of the biological growth from the filter media.

Moreover, no mechanism is included to provide hypolimnetic aeration, that is aeration or even water movement without destratification. The biofilter is the only component of the unit; there is no separate flotation platform to avoid generalized destratification.

The patent discloses that the device will help reduce biochemical oxygen demand (BOD), but no claims are made or method shown to reduce sludge accumulations or metals within a water body.

No mechanism is included to place the device in close proximity t,o sediments without introducing considerable suspended solids throughout the water column.

The patent also discloses that the filter media will have opposed surfaces at least one inch apart. This will eliminate the potential for use of random packing materials with smaller openings of products used for bacterial immobilization such as those of W. R. Grace or J. Manville.

A more efficient system would be based on the following concepts:

- The ability to preinoculate the biofilter with communities of micro-organisms specifically chosen for their ability to biodegrade completely the target pollutants to carbon dioxide and water or remove the target pollutants from the water.
- The ability to incorporate plants and higher life forms to optimize the overall water quality improvement.
- The ability to separate the processes of using air to move the water from the bottom to the surface, aeration, and causing the water to pass through the biofilter. Water flow per quantity of air injected can be optimized if the turbulence and friction caused by passing the air and water through the biofilter is eliminated. This technique would also allow control of the water flow so that water passes through the biofilter with sufficient speed and oxygen content to provide a net gain in oxygen within the lake.
- The ability to provide supplemental aeration, with a counter current flow, within the treatment device.
- The ability to entrain water, from within the water body, and bring it in contact with the surface and atmospheric oxygen.
- The ability to aerate the water from the hypolimnion and return it to this strata without destratifying the lake and raising the temperature of the hypolimnion.
- The ability to entrain and digest sediments within the device without distributing the sediments throughout the water body.
- The ability to remove BOD, nitrogenous wastes, organic sludge and metals from the water body.
- The ability to construct the device in two sections, the biofilter and the enclosure so that discrete sections of the water column or water body can be treated.
- The ability to use random packing materials, which have opposed surfaces less than one inch apart.

SUMMARY OF THE INVENTION

An object of the present invention is to provide a method and an apparatus for the in situ purification of water within water bodies, by biofiltration and aeration.

According to this method, polluted, nutrient-rich water or oxygen-deficient water is drawn into a submerged chamber from below the chamber or from the bottom of the water body. The chamber is in contact with the atmosphere at the surface of the water body. Aeration is accomplished from three potential sources of oxygen:

- air used in an airlift to bring the water to the submerged chamber;
- air diffused from the surface as the moving water is brought in contact with the atmosphere; and
- finally air optionally diffused within the deeper portion of the submerged chamber so that the rising bubbles operate in a counter current manner to the water flow providing efficient gas exchange.

Aquatic plants or attached terrestrial plants or other higher life forms, such as invertebrates or fishes may be grown within or upon the submerged chamber to contribute to the water purification.

The water then flows from the chamber through a biological filter which may have been preinoculated with selected communities of water purifying micro-organisms and essential nutrients.

Another object of the invention is to provide a method for the in situ biodegradation of organic sludge within a water body without distributing suspended solids throughout the water body.

A further object of the invention is to provide a method to aerate the hypolimnion of a lake without destratifying the water body.

Still another object of the invention is to provide an apparatus to carry out the above methods. This apparatus floats on water or sits on the bottom of the water body and comprises a framed structure defining a submerged chamber located near the surface of the water body and in contact with atmospheric air. The apparatus also comprises a filter bed made of filtering media, which is located below the submerged chamber. The filter media may be preinoculated with water purifying micro-organisms by techniques of immobilization or pre-growth. The apparatus further comprises a water duct leading into the submerged chamber. The water duct brings polluted or nutrient-rich water from below the biofilter, usually from the bottom of the water body, to near the surface within the submerged chamber. The water duct has at least one opening at either end into which water enters and then exits. Water entering the submerged chamber is aerated, in part by contact with atmospheric air at the surface. Then, the water may undergo biological purification by plants and micro-organisms and other higher life forms if such are present. Finally, the water flows through the biological filter before returning to the water body.

BRIEF DESCRIPTION OF THE DRAWINGS

The invention will be better understood upon reading the following non limiting description of several preferred embodiments of it, reference being made to the accompanying drawings where the arrows indicate how polluted or nutrient rich water circulates through the biofilter and in which.

In the following description, the same reference numbers have been used in all Figures to identify the same structural components.

DESCRIPTION OF THE EMBODIMENTS OF THE INVENTION

Figure 1:
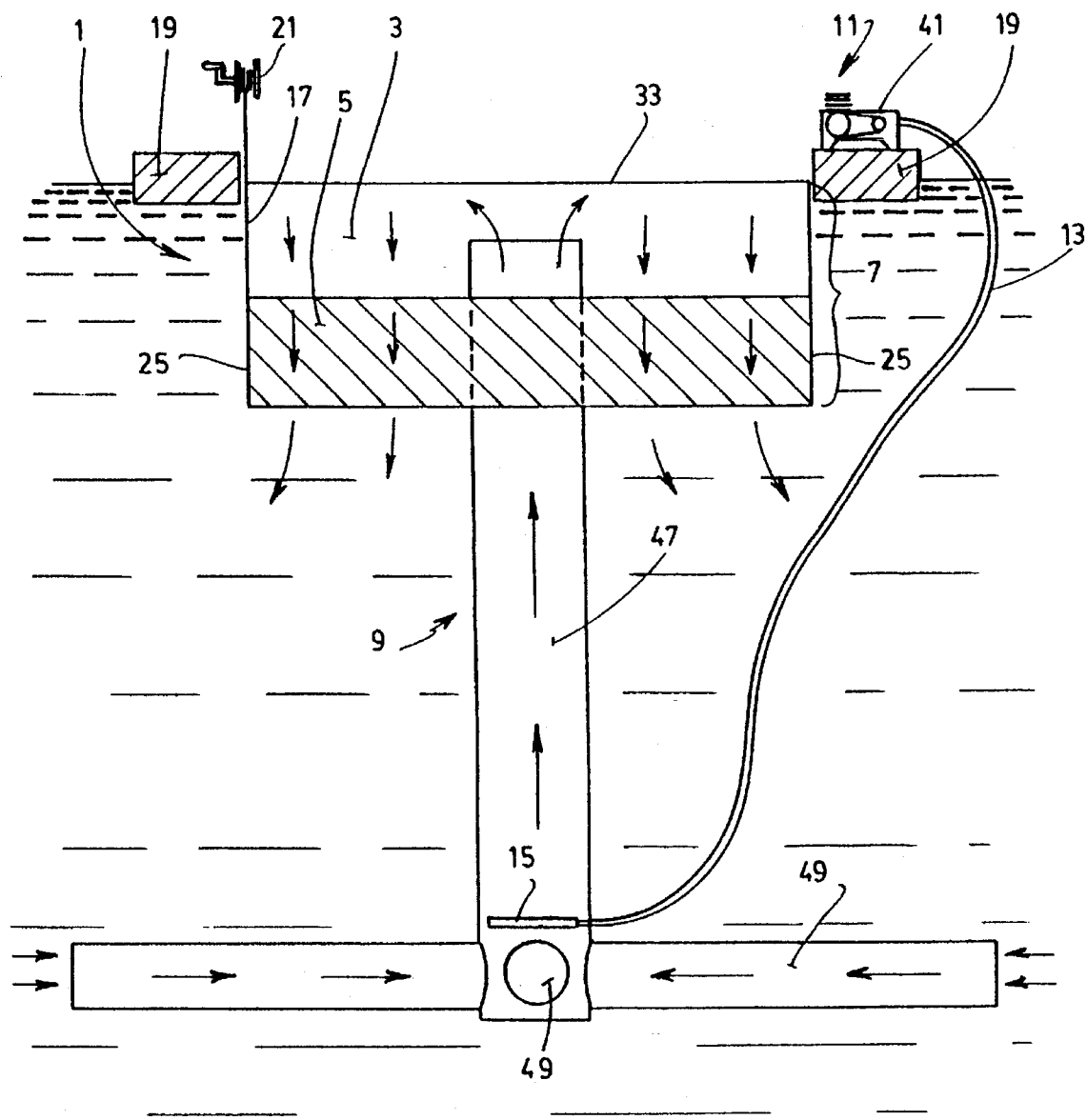
FIG. 1 is a side plan view of an apparatus according to the invention, having a water duct comprising a vertical main conduit connected to a submerged chamber and a plurality of lateral conduits attached to the vertical conduit, and wherein the water is drawn through the conduit by injection of air into the vertical portion.

As aforesaid, the water purification method according to the invention is intended to be used for the in situ purification by filtration and aeration of water bodies. This method comprises two steps. The first step consists of drawing polluted, nutrient rich or oxygen deficient water from the water body, usually near the bottom 1 of the same, into a submerged chamber 5 located at the surface 3 of the water body (as is shown in FIG. 1). This submerged chamber 5 has a top surface 7, which is open to ambient air to contribute to the aeration of the water passing through the apparatus. Supplemental aeration may also be used. The second step consists of passing, or letting pass, the oxygenated water from the submerged chamber 5 through a biofilter 9 comprising a filter bed 11, which may have been previously inoculated with water purifying micro-organisms, by immobilization by pregrowth or by other techniques. Water purifying micro-organisms and enzymes may also be continuously or intermittently fed into the biofilter to achieve specific results such as sludge solubilization. The water may also be caused to pass through a matrix of aquatic plants 15 and roots of terrestrial plants 13, which contribute to the water purification by nutrient uptake and by the formation of habitats for additional water purifying organisms. Various animals, e.g. as mollusks, crustaceans or fishes, may also be enclosed within the biological filter to contribute to the purification. These organisms, which form the ecological community designed for water purification, may subsequently be culled from the system and/or used to stock water bodies as part of a restoration program.

The filter bed 11 is made of physical media on which the micro-organisms grow and are brought in contact with the pollution or nutrient rich water. The filter media of the filter bed 11 used in accordance with the invention may comprise a combination of carriers and nutrients for the immobilization of water purifying micro-organisms.

The filter bed 11 may also be made up of a mass of surfaces of different filtering media placed one on top of another. There must be sufficient spacing between these surfaces to allow for the passage of the water through the surfaces and for the excess portions of bacterial growth to slough off, thus creating a self-cleaning filter bed. More than one type of filter media may be combined in any application.

Random packing material may be used in removable pouches. These random packing materials may include waste materials such as plastic off cuts or net mesh. Some companies manufacture random packing for waste water treatment with various names including Telpac™, Flexring™, Biomax™ and Tri-Pack™ to name a few.

A module of cross-corrugated sheets can also be used. These cross-corrugated sheets are also commercially available, for instance, the modules of ACCUPAC™, which are made of ultraviolet resistant polyvinyl chloride (PVC). These modules come in different styles, open area, surface area per unit volume and sizes.

Alternatively, the filter media may be made of material that can move with the water current to provide self cleaning, such as plastic beads, pumice, lava rock or other material.

The filter media should be able to be removed from the water for cleaning if necessary. Moreover, to optimize efficiency, the filter media should also be removable to be reinnoculated with appropriate micro-organisms and missing nutrients as necessary.

In this connection, it is worth mentioning that biofilters are standard pieces of equipment used in water purification. Early prototypes of this technology such as Canadian patent 747,976, however, have only recently appeared in the literature, and no system has been proposed with the attributes of the current invention, which is applicable to waste water treatment plants, as well as to fresh water or salt water bodies.

Biofilters increase the surface area available for the development of populations of water purifying micro-organisms to perform processes such as reduction of the biochemical oxygen demand (BOD) or nitrification. The aeration will also serve to reduce the chemical oxygen demand (COD), which can be unrelated to biological processes being due to influents containing chemicals such as iron in a ferrous ($Fe^{+2}$) state or simply anoxic water such as from springs.

The rates of water purification by biological filtration, other factors being equal, is in large part, dependent upon the quantity and physiological condition of the appropriate micro-organisms, upon the available surface area for growth of the micro-organisms, and upon the hydraulic loading through the filter media. Biofilters can allow for increased biological purification in reduced space and time compared to untreated systems. Use of biofilters and aeration in water bodies such as lakes can slow down and even, in some cases, reverse the natural aging processes of eutrophication. Yet, biofilters are often slow to start or the performance is less than optimal because of the problem of establishing and maintaining the optimal community of micro-organisms.

Generally, when excessive amounts of nutrients, particularly phosphorous and/or nitrogen, become available in water bodies, the nutrients result in the proliferation of aquatic plants, and the water body begins to age rapidly. Plants fix carbon and contribute to the rapid accumulation of carbon within the water body. In a lake, most of the nutrients in the water, often result from liberation from the sediments under anoxic conditions. During summer, for example, water bodies in temperate regions become stratified into three distinct layers: the epilimnion, the metalimnion and the hypolimnion. The epilimnion is in contact with the surface and contains warm oxygenated water. The metalimnion is a transition zone. The hypolimnion contains cold anoxic water and is in contact with the bottom. The anoxic conditions, in the hypolimnion, contributes to the release of phosphorous, ammonia, metals and short chain organic acids. During turnover periods, typically spring and fall, the nutrients are redistributed throughout the water column contributing to subsequent plant growth. The plants, in turn, fix carbon, which is deposited as sludge within the water body as the plants die.

In accordance with the invention, the purification and nutrient reduction within the water body is accelerated by moving water from the sediment/water interface to the surface where by-products of anaerobic metabolism can be dispelled and the water can oxygenated.

Figure 1A:
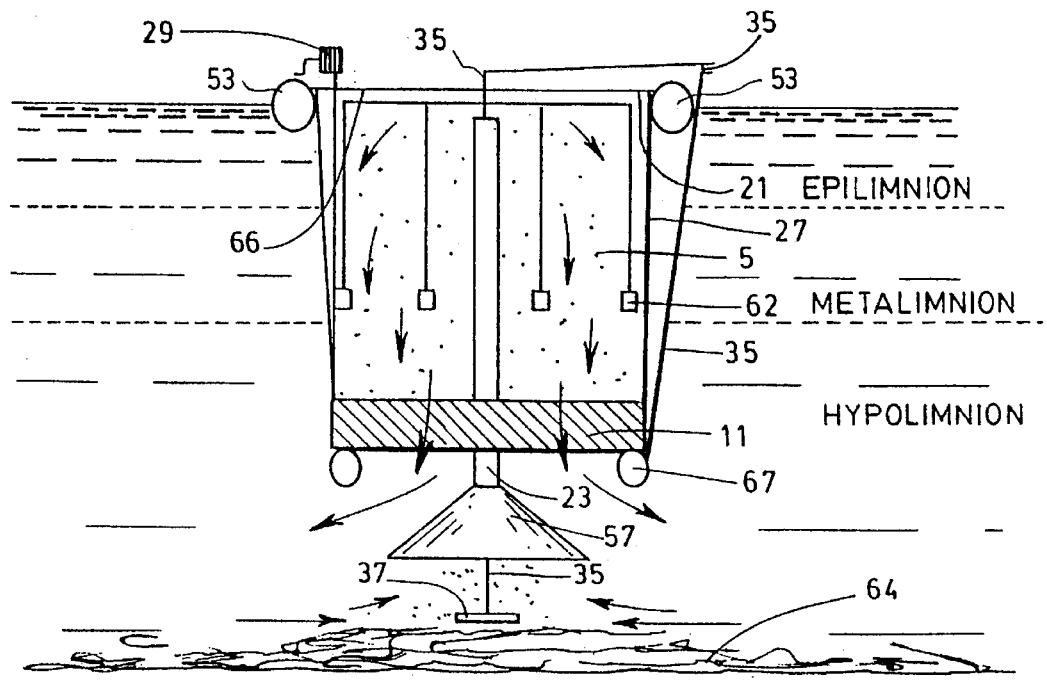
FIG. 1A is a side plan view of another apparatus according to the invention, where the biofilter extends into the hypolimnion returning treated and aerated water to this strata within a water body, this figure also showing supplemental aeration operating on a counter current principle.

In accordance with the invention, the apparatus disclosed hereinabove can also serve as a tool for hypolimnetic aeration. This allows oxygenated water to be returned to the hypolimnion without destratifying the lake. FIG. 1A shows one embodiment of the apparatus as used for hypolimnetic aeration. Supplemental aeration at 62 is used as necessary to bring the oxygen concentration to saturation in the water before returning the same to the hypolimnion. In this application, the biofilter 11 is lowered into the hypolimnion and the vertical conduit is extended to near the surface. The conduit may be made of a material such as a culvert made of plastic (e.g. Big-O™) or metal; the conduit may also be made of other rigid material. Movement of water through the conduit by airlift technology creates negative pressure within the conduit as compared to outside. The conduit must be strong enough to resist the pressure differential. The extension of the conduit to the surface assures the water leaving the conduit will be caused to be brought in contact with the surface and the atmospheric oxygen concentration of 20% and then to flow through a counter current of rising air bubbles to optimize residual gas exchange. The diffusers 62 for the supplemental aeration are placed well above the biofilter media 11 to assure that there is no resistance to flow through the media and that the supplemental aeration 62 serves only for aeration and has no effect on the water movement generated by the air injection 35,37 into the vertical conduit 23.

Figure 1B:
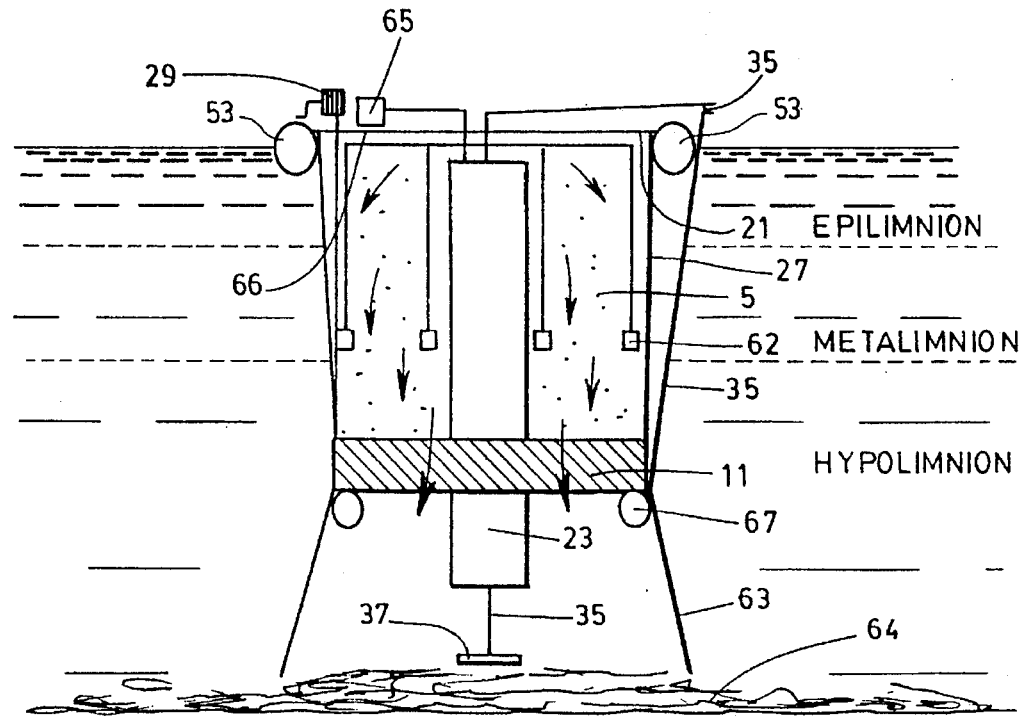
FIG. 1B is a side plan view of another apparatus according to the invention, where the apparatus operates to entrain light weight sludge into the device, bringing the sludge into contact with bacterial cultures and enzymes specifically produced for their ability to solubilize sludge, where soluble nutrients generated by the sludge solubilization are subsequently removed by aeration and biological filtration and where any residual suspended solids are returned to the bottom rather than being dispersed in the water column.

In accordance with the invention, the apparatus disclosed hereinabove can also serve as a tool for reduction of sludge 64 from the bottom of water body or within a waste water treatment plant. An embodiment of the apparatus for this use is shown in FIG. 1B. Sludge 64 is entrained into a vertical conduit 23, by means of air lift using an air line 35 and diffuser(s) 37. The organic sludge is brought into contact by a pumping system 66, with bacterial cultures preactivated to optimize enzyme production for sludge solubilization (Ehrlich et al. "A diagnostic and ecological approach to the purification of sewage, toxic substances and water bodies", Ecological Engineering for wastewater Treatment, Proceedings, 1991). The preactivation is accomplished either on land or in a fermenter 65 mounted on the flotation system 21. The counter current aeration system 62 as disclosed hereinabove serves to provide aeration and to increase the time that the solids are maintained within the submerged chamber 5. Solubilized nutrients are then removed as the water passes through the biological filter 11, where the water is brought into contact with the immobilized micro-organisms. Any residual solids are prevented from entering the water column of the water body, outside of the apparatus, by the curtains 63 descending into the sludge layer below the apparatus. In many applications, sludge 64 is very light material. Removal of sludge from under the apparatus can cause adjacent sludge to flow into the apparatus. In this manner the apparatus will treat zones larger than the dimensions of the apparatus and minimize the movements necessary to treat the entire water body.

Figure 2:
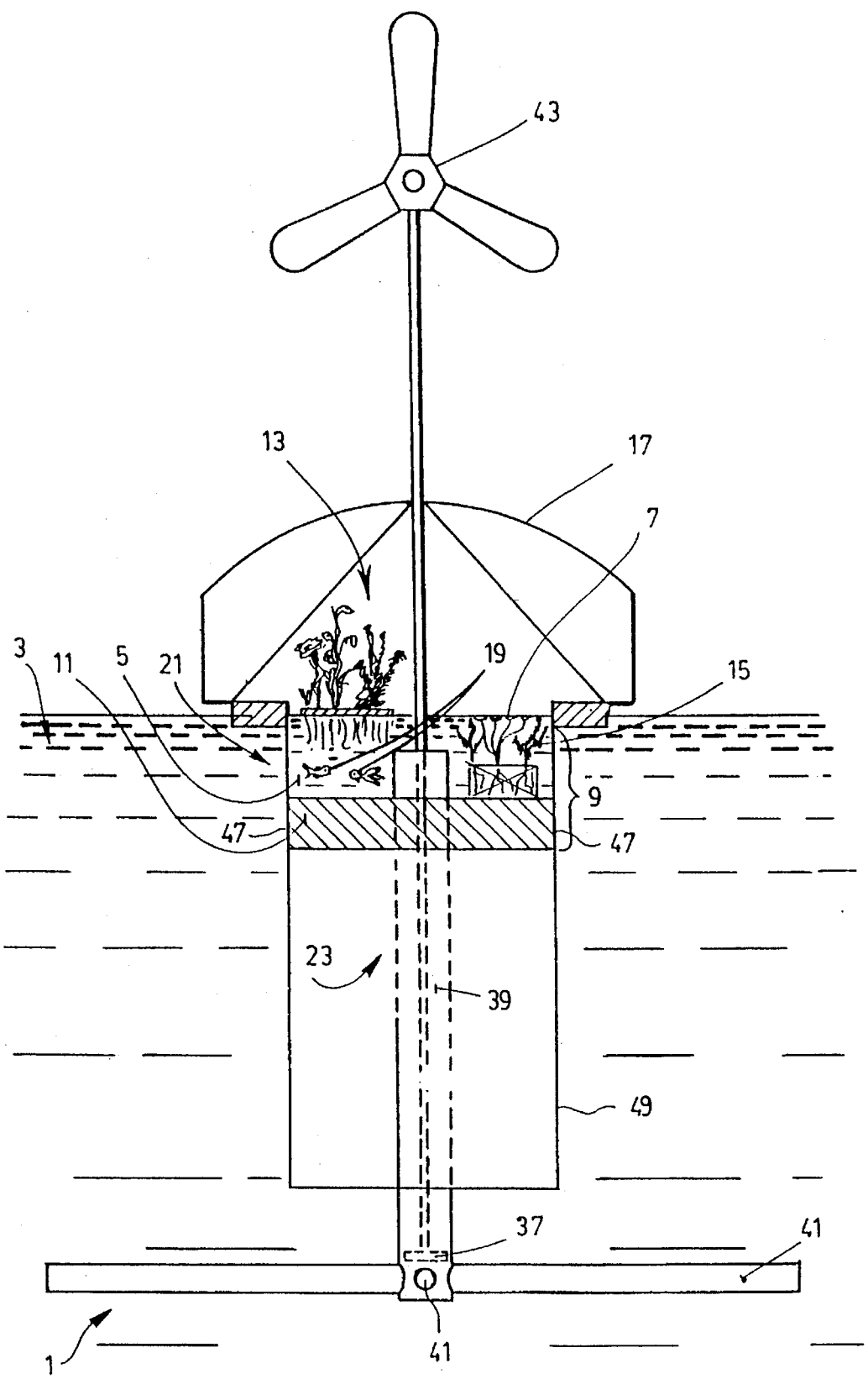
FIG. 2 is a side plan view of another apparatus according to the invention, whose means of drawing water into the conduit is a windmill that is located above the surface of the body of water and used for driving an air or water pump, this figure also showing a greenhouse containing plants and aquatic organisms, installed on the apparatus.

As shown in FIG. 2, the purification method according to the invention, may also comprise the additional steps of growing rafted terrestrial plants 13 in contact with the air above the apparatus and/or growing aquatic plants 15 on or in the submerged chamber 5. These plants 13, 15 provide contribution for nutrient removal, the fixing of metals and the development of habitats for micro- & macro-organisms. The plants 13,15 also offer a simple means to harvest and remove captured and/or transformed nutrients and pollutants from the water body. The ability to include the use of a more complete ecological community, designed for its ability to purify waste water, increases the efficiency of the invention.

In some areas, the growing season of terrestrial or aquatic plants in contact with the air, is relatively short because of killing frosts. It is possible, however, to lengthen the growing season through the use of greenhouses. According to the invention, greenhouse technology can also be combined with the apparatus, where a greenhouse 17 is installed above the top surface 7 of the submerged chamber 5 (as is shown in FIG. 2). The greenhouse protects the plants from contact with freezing air. The thermal mass of the circulating water will maintain the air within the greenhouse at near the same temperature as the water. This technology could be particularly interesting, in cold climates, for industrial applications having warm effluents (e.g. petrochemical plants). The heat in the effluent would allow the growth of even warm water plants such as water hyacinths, which are well known and used for their ability to purify water of soluble and particulate pollutants.

Therefore, the purification method according to the invention may further comprise the additional steps of placing a plurality of aquatic organisms 19 inside the submerged chamber 5. The aquatic organisms may include invertebrates and fishes. Invertebrates, such as various mollusks are known for their ability to filter water and accumulate various pollutants. This technology offers another means, in addition to the plants to remove pollutants from the system. The aquatic animals will also serve to reduce the amount of carbon within the system, since as one group feeds upon another up to 40% of the carbon is transformed into carbon dioxide. This production of carbon dioxide will help to maintain adequate levels for the plants within the greenhouse. The aquatic animals, which feed on the microorganisms will help to minimize the synthesis of biological sludge and to avoid excessive growth within the media of the biofilter. Smaller aquatic organisms will be consumed by larger ones; each step resulting in a net loss of carbon due to the production of carbon dioxide as a by-product of metabolism. Excessive production of aquatic organisms, such as fishes, may be used to stock water bodies. In certain applications, the apparatus could even serve the designed purpose of a hatchery and nursery to produce animals (e.g. fishes to restock the water body). This application would be particularly appropriate in lakes, where the low pollutional loading entering the submerged chamber 5 would permit the growth of fishes. Plants and their roots 13,15 or other physical material, within the submerged chamber 5 would provide shelter from larger predators, which may enter the submerged chamber by way of the intake conduit 23. The biological filter 11 below the fishes would protect the lake from nutrients, produced by the fishes, by removing both carbonaceous and nitrogenous BOD.

Referring again to FIG. 1, the apparatus according to the invention for carrying out the in situ purification method dialysed hereinabove, comprises a framed structure 21 or cage defining the submerged chamber 5 located near the surface 3 of the water body. It also comprises the filter bed 11 made of filter media, which is located within the water body. The filter media may be preinoculated with water purifying micro-organisms.

The apparatus also comprises a water intake duct 23 connected to the submerged chamber 5 of the biofilter 9 and means 25 for drawing nutrient rich or polluted water from the water body, usually from near the bottom 1 of the same, through the water duct 23 into the submerged chamber 5, which is located near the surface and in contact with the air. For this purpose, the water duct 23 has, at least, one opening below the biological filter 11.

As is shown in FIG. 1, the water conduit 23 preferably comprises a vertical main conduit 39, which is connected to the submerged chamber 5; there may also be one or more lateral conduits 41 connected to the vertical one 39. The lateral conduits 41 bring water from outside the zone of the effluent of the apparatus towards the submerged chamber.

It should be pointed out that the water duct may comprise a plurality of lateral ducts 41, which work together to bring water from different areas into the vertical pipe 39. These lateral ducts may be made of flexible pipes such as non-perforated drain pipes or culverts.

The vertical pipe 39 can be made of a plastic or metal piping or culverts, such as the commercially available BIG-O™, or it can also be framed and lined with an impermeable membrane. The cross-section of the vertical pipe 39 has to be designed according to the technique to be used to draw the water into the vertical conduit 39. This is particularly important when the water movement is to be generated by air lift technology. The organization of the air diffusers, as will be disclosed hereinafter, will play a critical role in the combined desired effects of water movement and aeration. The cross section, of the vertical conduit 39, also has to be designed according to the depth and volume of water that is desired to be circulated.

A cross-section smaller than the area defined by the air bubbles, will offer more resistance and diminish oxygen transfer as the bubbles coalesce together. The vertical conduit 39 should be sufficiently large so that there is no obstruction to the passage of the water. The bubbles and water should rise with laminar flow. The use of diffusers, which produce smaller bubbles provide better oxygen transfer. Diffusers such as those produce by Aquatic-EcoSystems in Apopka, Fla. have proven beneficial for moving water and providing aeration. On the other hand, an excessively large cross-section could enable water to flow back into the vertical pipe rather than being forced out of it. Therefore, any of these two extremes will cause a decreased efficiency of the flow rate through the filter bed and a reduced biological efficiency.

Figure 7:
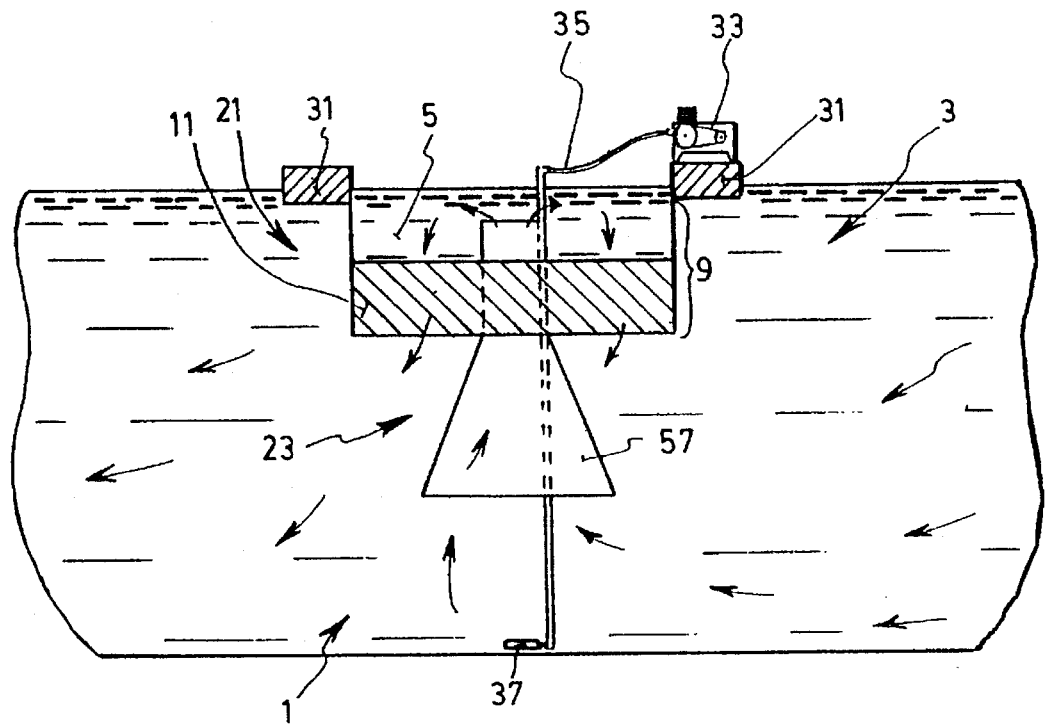
FIG. 7 is a side plan view of still another apparatus according to the invention, whose water intake conduit includes a funnel serving to separate treated and untreated water, the funnel being also shown in FIG. 1A.

In certain bodies of water, with adequate water movement or mixing, such as in waste water treatment plants or other unstratified water bodies or portions of water bodies, the conduits 39,41 can be eliminated or replaced by a simple funnel 57, as is shown in FIGS. 1A and 7, which is connected to the submerged chamber 5. Water rising, from below the biofilter 9, due to the injection of air in an appropriate pattern, quantity and bubble size, is directed by way of the funnel 57 into the conduit leading to the submerged chamber 5. Then the water may be brought in contact with plants, as in FIG. 2, before passing through the filter bed 11 of the biofilter 9, which is located in the bottom of the chamber. Supplemental aeration 62 (FIG. 1A) may be added as necessary. The funnel 57 also serves to separate treated water entering the submerged chamber 5 from treated water leaving the biofilter 9. Flow rates through the filter bed 11 can be adjusted, by controlling the rate air injection used to entrain water into the submerged chamber 5, to assure at net gain in oxygen in the hypolimnion even after the biological filtration.

Figure 8:
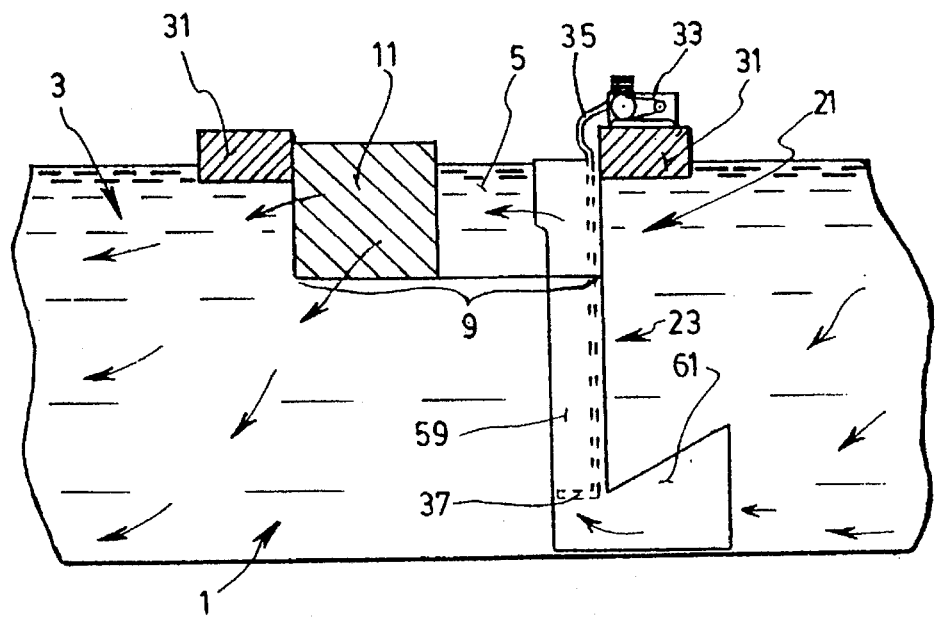
FIG. 8 is a side plan view of a further apparatus according to the invention, having a water intake conduit comprising a vertical pipe connected to the submerged chamber and a horizontal structure communicating with the vertical conduit to promote horizontal flow of water through the biofilter.

As is shown in FIG. 8, the conduits 39 and 41 of the water 23 may be replaced by a vertical conduit 59, which is connected to the submerged chamber 5. A horizontal funnel-like structure 61 may also be a fixed to the entrance of the vertical conduit 59. The funnel-like structure 61 brings the water from below the apparatus into the vertical conduit 59 and then into the submerged chamber 5. In this application, water passes horizontally through the filter bed 11. In some other applications, such as in water bodies with lateral currents, the funnel-like structure 61 may be affixed directly to the lateral side of the biofilter 9. In all these cases the current of the water body will help generate the movement of the water through the well anchored biofilter 9.

Preferably, the framed structure 21 comprises a large area, which assures the greatest current at its entry point and a relatively slow flow through the filter bed 11. In this connection, the biofilter 9 can be designed so that the water leaves vertically through the bottom of the biofilter 9 (as is shown in FIGS. 1 or 7). However, it may also be designed so that the water leaves horizontally through the sides of the biofilter (as shown in FIG. 8).

As is shown in FIGS. 1, 1A, 1B, the framed structure 21 may float on the surface 3 of the water body and have a flexible liner 27. The framed structure 21 may also comprise a mechanism for raising the biofilter 9, within or just out of the water column. The movement of the filter bed 11 could be to inspect, service or change the filter media. The position of the filter bed 11, within the water column, could also be changed to facilitate operations such as supplemental aeration 62, hypolimnetic aeration or sludge reduction and to allow the sediment barriers 63 to reach into the sediment so as to stop sediments from being entrained into the water column outside of the biofilter 11. The mechanism, to change the position of the filter bed 11, comprises a winch 29 which is mounted on the flotation structure 21; the mechanism may also include adjustable flotation chambers 67 connected directly to the filter bed 9. The quantity of air in the flotation chambers can be controlled via the conduit 35: compressed air can be added or released. Movement of the filter bed to the surface, will result in the outward movement of the flexible liner 27. Positive pressure from the pumping of water into the submerged chamber 5 will assure that the flexible liner bellows out from the structure, in stationary waters. Compressed air can be added to the floatation of the filter bed to bring it to the surface or to sink it to the normal operating depth.

One of the most suitable means to draw water into this invention is by air lift technology, which is energy efficient and provides oxygen transfer during the process. However, different means 25, disclosed hereinafter, can also be used with or without an appropriate power source, to draw the water from below the biofilter 11 into the submerged chamber 5.

Figure 3:
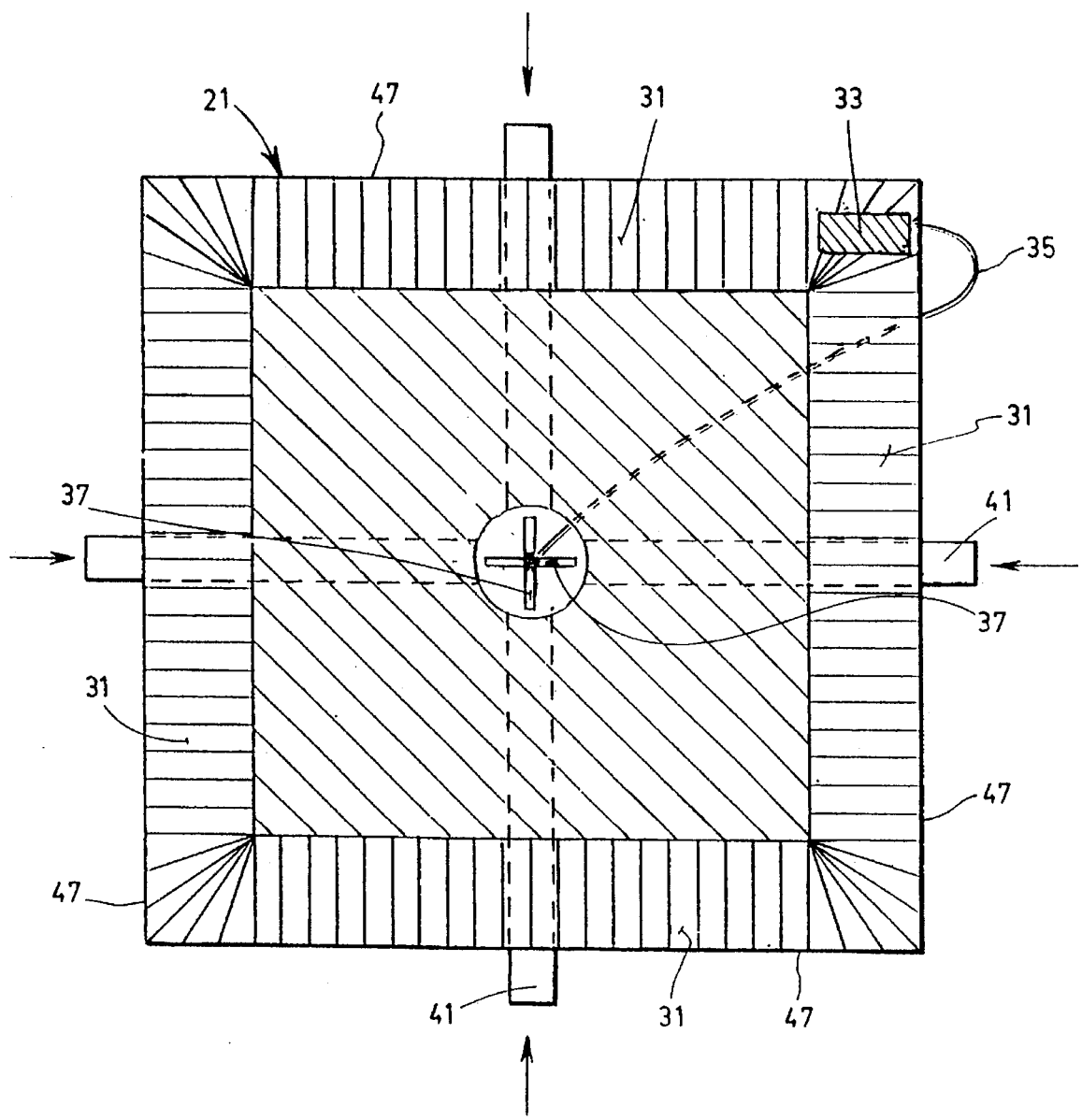
FIG. 3 is a top plan of a possible walkway around the apparatus shown in FIGS. 1, 1A, 1B and 2.

As shown in FIG. 1, the drawing means may comprise an air pump 33, which is devised to inject air via a hose or pipe 35 and one or more diffusers 37 into or below the opening of the water conduit 23 leading to the submerged chamber 5 so as to generate an upward flow of air bubbles and water within the water duct 23. The air pump 33 may be installed on the flotation platform 31 above or to the side of the framed structure 21 (as shown in FIGS. 1 and 3).

As shown in FIG. 2, the drawing means 25 may also comprise a windmill 43 located above the surface 3 of the body of water, so as to drive either a water or air pump to create an upward flow of water through the water duct 23. In this case, no fuel powered source is needed. This is an ideal apparatus for remote, windy areas. In FIG. 2, the windmill 43 drives an air pump, which supplies air to the diffusers 37 located below the water duct 23 leading to the submerged chamber 5. This generates an upward flow of water within the water duct 23, in the same way as described earlier in FIG. 1. One example of such a windmill 43 is the one sold under the trade mark BREEZE™, which drives a diaphragm pump and is readily adapted to the present invention.

Figure 4:
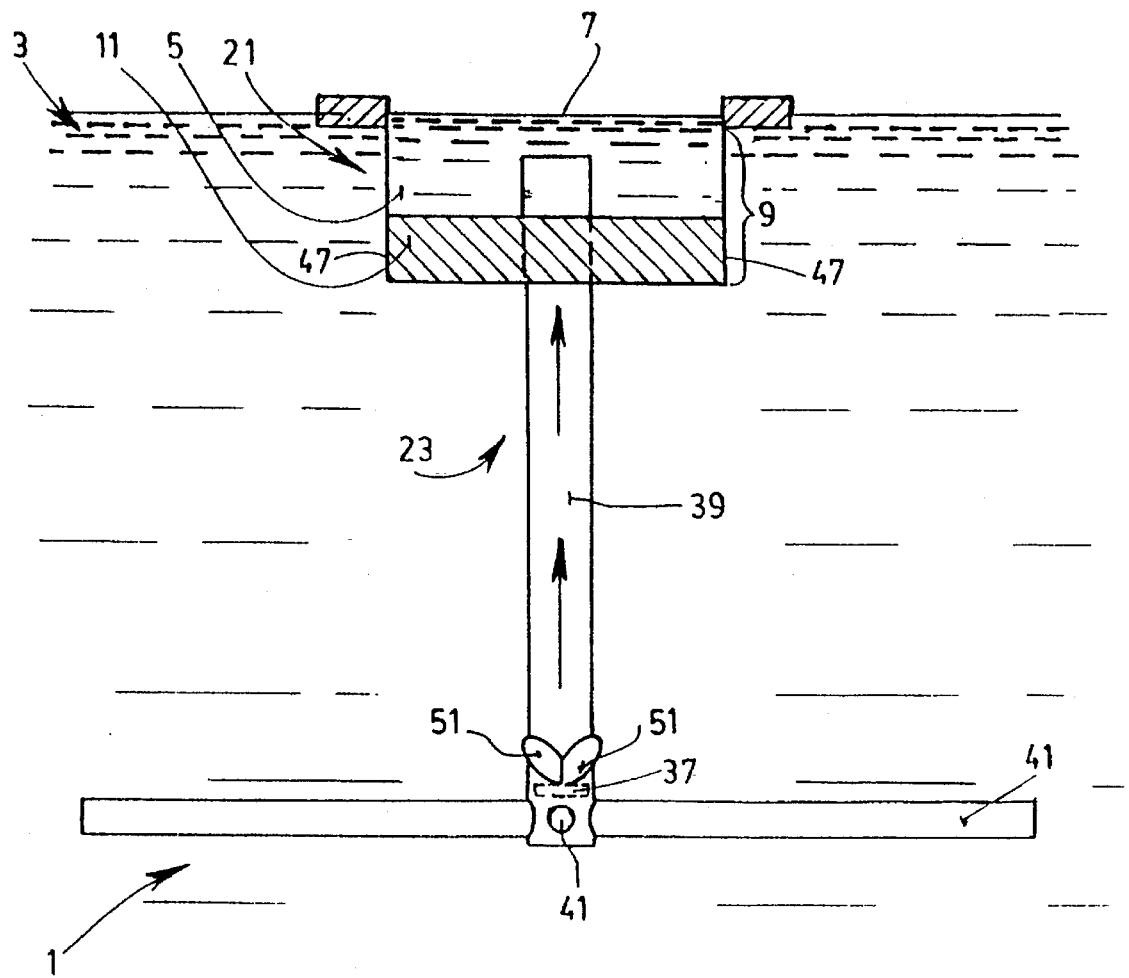
FIG. 4 is a side plan view of a further apparatus according to the invention, whose means of drawing water is a propeller located within the water conduit of the apparatus.

As is shown in FIG. 4, the drawing means 25 used for entraining the untreated water may further comprise a propeller 51, which forces the water upwards within the water duct 23 and toward the submerged chamber 5. This propeller 51 can be located inside the water duct 23.

Figure 5:
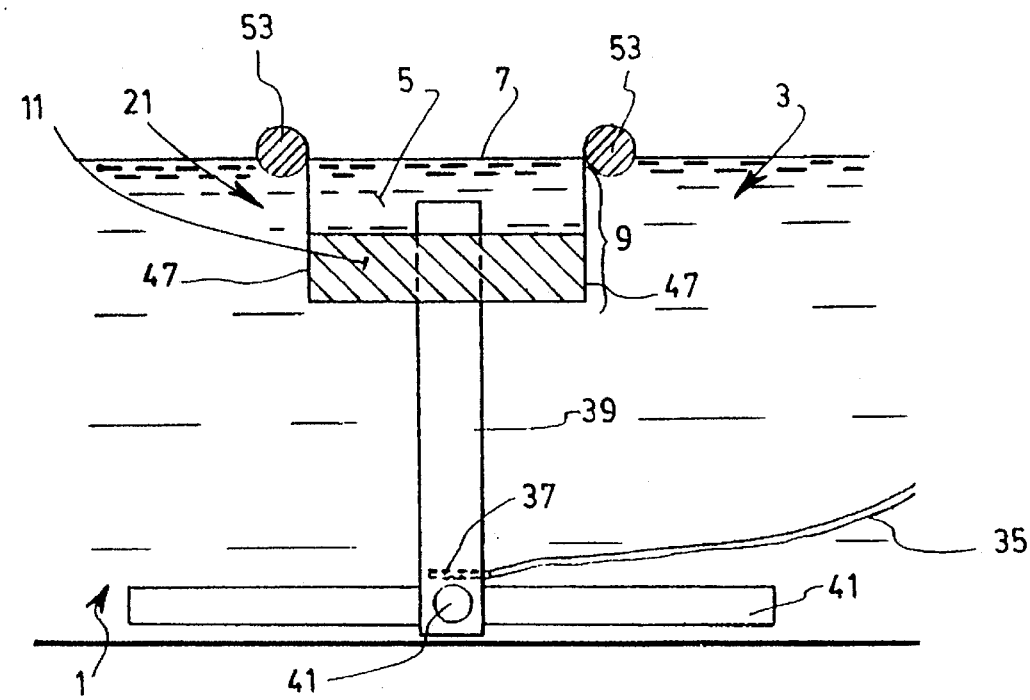
FIG. 5 is a side plan view of the apparatus show in FIG. 1, with the air compressor located on land or on another structure some distance from the apparatus, the apparatus being shown floating on the surface of the water by flotation pipes or other devices.
Figure 6:
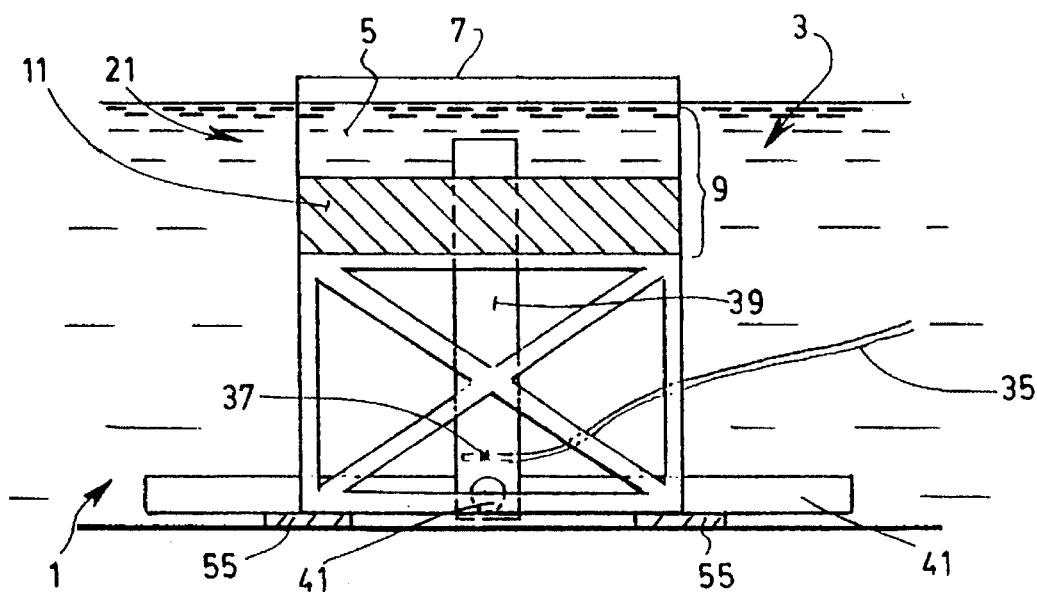
FIG. 6 is a side plan view of still another apparatus according to the invention, where the support is largely from a plurality of piles, which rest on the bottom rather than flotation.

As is shown in FIGS. 1A, 1B and 5, the framed structure 21 floats at the surface 3 of the water body with the help of flotation devices 53, which are attached to the framed structure 21. Alternatively, as is shown in FIG. 6, the framed structure 21 can also be a self-standing structure, which is built upon a plurality of piles 55 resting on the bottom 1 of the water body. Both FIGS. 5 and 6 show that the air pump 33 can be installed on dry land rather than on or associated with the framed structure 21.

As mentioned earlier, it is possible to prevent the water surrounding the framed structure 21 from being destratified by effluent from the biofilter 9. As is shown in FIGS. 1B and 2, the framed structure 21 may have, at least, one outside surface 47, which extends towards the bottom into the hypolimnion (FIG. 2), or the biofilter itself may be extended into the hypolimnion (FIG. 1B). This assures that water taken from this strata will also be returned there so as not to destratify the thermal layers.

The outside surface 47 can take the form of a plurality of external sides, each of which is extendible below the metalimnion or a one-piece extendible surface, which surrounds the framed structure 21. This outside surface does not have to be rigid.

As is shown in FIG. 2, the framed structure may also have an impermeable liner or curtain 49 attached at one end of the outside surface 47 and weighted at the other end. This impermeable liner 49 is hung around the framed structure 21 also ensuring that the effluent from the biofilter 9 does not destratify the water column.

Although the present invention has been explained hereinafter by means of preferred embodiments thereof, it should be pointed out that any modifications to these preferred embodiments, within the scope of the appended claims, are not deemed to change or alter the nature and scope of the invention.

What is claimed is:

1. A method for the in situ purification by aeration and biofiltration of water from a water body, said method comprising the steps of:

drawing polluted, nutrient rich or oxygen deficient water from the water body into an upper portion of a submerged chamber held adjacent to the surface of said water body, said submerged chamber having a top surface open to the ambient air to cause said polluted or nutrient rich water to absorb oxygen from contact with the surface, said chamber also having a bottom surface and closed sidewalls;

letting said oxygenated water flow down and pass from said submerged chamber through a self-cleaning biofilter extending over at least one part of the bottom surface of said chamber, said biofilter comprising a filter bed made of filtering media, said filter bed being located within said body of water and having previously been inoculated with water purifying bacteria; and subjecting the water to a supplemental aeration within the submerged chamber by injecting air into a lower portion of said chamber in such a manner that rising air bubbles move against the water flowing down, thereby creating a counter-current for efficient gas exchange.

2. A method according to claim 1, comprising the additional step of:

drawing organic sludge or sediment from the bottom of said water body into a conduit leading to said upper portion of the submerged chamber;

introducing into said submerged chamber microbial cultures specifically grown to optimize production of enzymes which solubilize said organic sludge or sediment said solubilization calling for a biochemical oxygen demand (BOD); and meeting said biochemical oxygen demand (BOD) by the said aeration and biological filtration.

3. A method according to claim 1, wherein the water from the water body is drawn from below the biofilter into the submerged chamber by injecting air through a conduit leading to the submerged chamber, said air injection generating an upward flow of water within the conduit towards the submerged chamber.

4. A method according to claim 1, wherein the water from the water body is drawn into the submerged chamber by a windmill which, when exposed to wind, drives an air pump, said air pump pushing air to at least one diffuser located below a vertical conduit leading into the submerged chamber, the upward movement of air from said at least one diffuser entraining water into the vertical conduit and thus creating an upward flow into the submerged chamber.

5. A method according to claim 1, wherein the water from the water body is drawn into the submerged chamber by a propeller, which forces water into a vertical conduit and then into the submerged chamber, said propeller being located within said vertical conduit.

6. A method according to claim 1, comprising the additional step of immobilizing desirable micro-organisms and essential nutrients within or upon the media of the biofilter.

7. A method according to claim 1, comprising the additional steps of growing rafted vascular plants in contact with ambient air as well as growing aquatic plants inside submerged chamber, said plants filtering said water to absorb and to accumulate nutrients and metals which are present in the said water, said plants also forming habitats for micro- and macro-fauna.

8. A method according to claim 1, comprising the additional steps of placing a plurality of aquatic organisms inside said submerged chamber, said organisms inside said submerged chamber being used to treat said water by consuming particulate material or other life forms or by-products thereof.

9. An apparatus for the in situ purification by aeration and biofiltration of polluted, nutrient rich or oxygen deficient water from a water body, said apparatus comprising:

a framed structure defining a submerged chamber held adjacent to the surface of the body of water, said chamber having a top surface open to ambient air, a bottom surface and closed sidewalls;

a self-cleaning filter bed made of filtering media, said filter extending over at least one part of the bottom surface of said chamber within said body of water, said filter bed being preinoculated with water purifying micro-organisms;

a water conduit connected to said submerged chamber, said conduit having at least one opening below the said biofilter and another in an upper portion of said submerged chamber;

means for drawing water from the water body through said conduit into the upper portion of the submerged chamber to cause said polluted or oxygen deficient water to be oxygenated by contact with the ambient air prior to flowing down and passing through said filter bed; and air diffusers connected to a source of compressed air, said air diffusers being located within a lower portion of said submerged chamber said that said compressed air be diffused into the lower portion of said submerged chamber to cause air bubbles to rise against the water flowing down and to create a counter-current for efficient gas exchange.

10. An apparatus according to claim 9, further comprising:

means for drawing organic sludge and sediments from the bottom of the said water body into said vertical conduit and then into said submerged chamber and for causing said organic sludge and sediments to contact microbial cultures which are continuously or intermittently introduced within said chamber, said microbial cultures being specifically grown to optimize production of enzymes which solubilize said organic sludge of sediment, said solubilized sludge generating a biochemical oxygen demand (BOD) that is met by the aeration and biological filtration capacity of the said apparatus.

11. A method according to claim 9, wherein said means for drawing said polluted or oxygen deficient water comprises an air pump capable of injecting air via a pipe or hose to at least one diffuser located within said water conduit leading to said submerged chamber so as to generate and upward flow of air bubbles and water within said water conduit into the submerged chamber.

12. An apparatus according to claim 11, wherein said air pump is installed on an outside platform or walkway, said platform or walkway being above the surface of the water body.

13. An apparatus according to claim 11, wherein said air pump is on dry land whereas said framed structure is in the water.

14. A apparatus according to claim 9, wherein said means for drawing said polluted, nutrient rich or oxygen deficient water comprises a windmill located above the surface of the body of the water or on land, whereas said windmill, when exposed to wind, drives an air pump, said air pump sending air to at least one diffuser located into said water conduit leading to said submerged chamber so as to generate an upward flow of air bubbles and water within said water conduit and into submerged chamber.

15. An apparatus according to claim 9, wherein said means for drawing said polluted, nutrient rich or oxygen deficient water comprises a propeller which forces water upward within said water conduit and toward said submerged chamber, said propeller being located inside said water conduit.

16. An apparatus according to claim 9 for use in a water column consisting of three layers, said layers consisting of an epilimnion, a metalimnion and a hypolimnion, wherein said framed structure comprises floatation devices to make it float on said surface of said body of water and a flexible inner liner, said framed structure also comprising a mechanism for rising and lowering the filter bed within said the water column, whereas the said filter bed can be raised for inspection or media servicing or lowered to reach the hypolimnion and achieve hypolimnetic aeration or sludge digestion.

17. An apparatus according to claim 16, wherein the mechanism for raising or lowering said filter bed comprises a winch mounted on the said flotation structure.

18. An apparatus according to claim 16, wherein the mechanism for raising or lowering said filter bed consists of another flotation device fixed to the filter bed and in which compressed air may be added or released to either bring said filter bed close to the surface or to sink said filter bed to a depth permitted by retaining cables or said flexible liner.

19. An apparatus according to claim 9, wherein said framed structure floating near said surface of said water body has floatation devices attached to it.

20. An apparatus according to claim 9, wherein said framed structure is a self-standing structure, permanently built on a plurality of piles resting on the bottom of said water body.

21. An apparatus according to claim 9, also comprising a greenhouse installed on top of said framed structure and including said submerged chamber to allow plants to grow above and within said submerged chamber for long periods of time, even during inclement weather, making it possible for the plants to carry out water purification all year.

22. An apparatus according to claim 9, wherein said water conduit comprises a vertical main conduit connected to said submerged chamber and at least one lateral conduit connected to said vertical conduit, said lateral conduit bringing said water from some horizontal distance from said biofilter into said vertical conduit and said vertical conduit bringing said water into said upper portion of said submerged chamber.

23. A method for the in situ purification by aeration and biofiltration of water from a water body, said method comprising the steps of:

drawing polluted, nutrient rich or oxygen deficient water from the bottom of said water body into an upper portion of a submerged chamber held adjacent to the surface of said water body, said submerged chamber having a top surface open to the ambient air to cause said polluted or nutrient rich water to absorb oxygen from contact with the surface said chamber also having a bottom surface and closed sidewalls;

simultaneously drawing organic sludge or sediment from the bottom of said water body into said submerged chamber;

introducing into said submerged chamber microbial cultures specifically grown to optimize production of enzymes which solubilize said organic sludge or sediment, said solubilization calling for a biochemical oxygen demand (BOD);

letting said oxygenated water and said solubilized organic sludge and sediment flow down and pass from said submerged chamber through a self-cleaning biofilter extending over at least one part of the bottom surface of said chamber, said biofilter comprising a filter bed made of filtering media, said filter bed being located within said body of water and having previously been inoculated with water purifying bacteria;

subjecting the water to a supplemental aeration within the submerged chamber by injecting air into a lower portion of said submerged chamber in such a manner that rising bubbles provided by said supplemental aeration move against the water flowing down, thereby creating a counter-current for efficient gas exchange;

meeting said biochemical oxygen demand (BOD) by the said aeration and biological filtration; and returning the water to the bottom of said water body without destratifying said water body.

24. An apparatus for the in situ purification by aeration and biofiltration of polluted, nutrient rich or oxygen deficient water from a water body, said apparatus comprising:

a framed structure defining a submerged chamber held adjacent to the surface of the body of water, said chamber having a top surface open to ambient air, a bottom surface and closed sidewalls, said framed structure being submerged in a water column consisting of three layers, said layers being composed of an epilimnion, a metalimnion and a hypolimnion;

a self-cleaning filter bed made of filtering media extending over at least one part of the bottom surface of said chamber within said body of water, said filter bed being preinoculated with water purifying micro-organisms;

a water conduit connected to said submerged chamber, said conduit having at least one opening in the hypolimnion below the said biofilter and another in an upper portion of said submerged chamber, means for drawing water from the hypolimnion of said water body through said conduit into the upper portion of the submerged chamber to cause said polluted or oxygen deficient water to be oxygenated by contact with the ambient air prior to flowing down and passing through said filter bed;

air diffusers connected to a source of compressed air, said air diffusers being located within a lower portion of said submerged chamber so that said compressed air be diffused into the lower portion of said submerged chamber to cause air bubbles to rise against a descending water flow and thus to create a counter-current for efficient gas exchange, wherein said framed structure has at least one outside surface which extends into said hypolimnion of said water body to ensure that water passing through the biofilter returns to said hypolimnion without destratifying the water column surrounding said framed structure.

25. An apparatus according to claim 24, wherein said framed structure has an impermeable liner which is attached to and hangs around said framed structure and which extends into the hypolimnion to ensure that water passing through said biofilter returns to said hypolimnion without destratifying the water column surrounding said framed structure.

* * * * *